Aug. 9, 1960 J. E. SCHRINER ET AL 2,948,633
FLOCKING MECHANISM AND METHOD
Filed July 17, 1956 2 Sheets-Sheet 1

INVENTORS
JOHN E. SCHRINER,
CHARLES R. MASTERS,
BRUNO T. CZACHERSKI
BY
Oberlin & Limbach
ATTORNEYS.

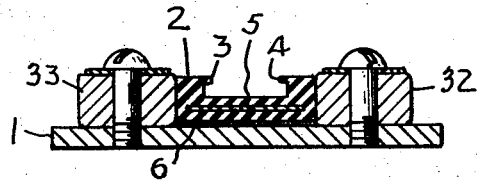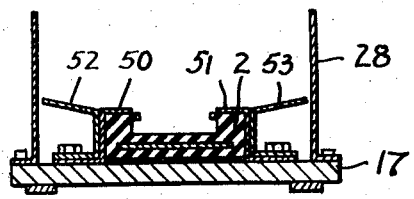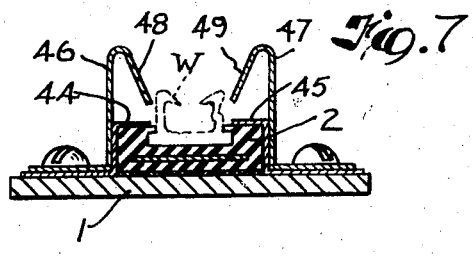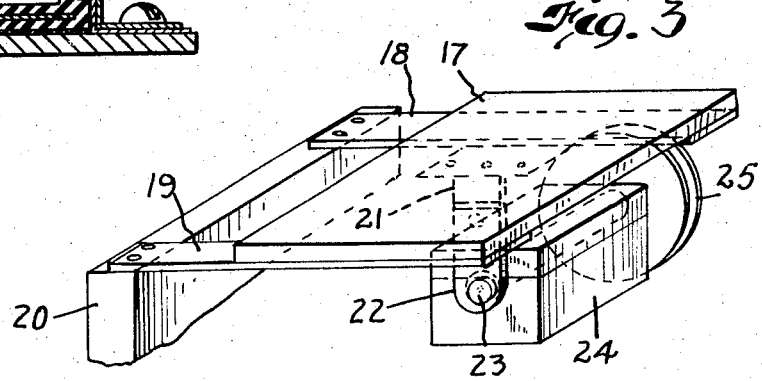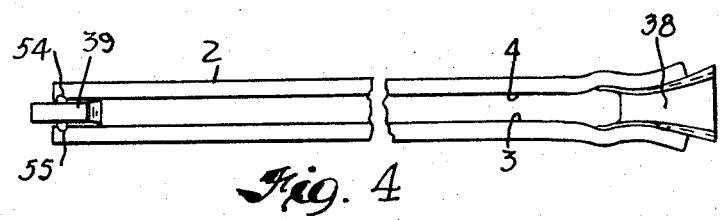

United States Patent Office 2,948,633
Patented Aug. 9, 1960

2,948,633

FLOCKING MECHANISM AND METHOD

John E. Schriner, Willoughby, Charles R. Masters, Mentor-on-the-Lake, and Bruno T. Czacherski, Painesville, Ohio, assignors to The Eagle-Picher Company, Cincinnati, Ohio, a corporation of Ohio Filed July 17, 1956, Ser. No. 598,477

14 Claims. (Cl. 117—20)

This invention relates as indicated to a novel flocking mechanism and method of flocking, and is more particularly concerned with the flocking of certain relatively difficult articles such as elongated strips of complex cross-section.

Two principal methods are known and employed for the application of flock to a wide variety of articles, the one involving mechanical vibration of the article to be flocked, and the other passage of such article through an electrostatic field. The latter method is relatively expensive but is better adapted to the flocking of articles of unusual shape and especially for application of flock in a uniform manner thereto.

A wide variety of flexible resiliently deformable elongated rubber strips of general channel shape cross-section are now employed for sealing purposes, and more particularly such channel shape rubber strips are now widely employed in automobile window openings to receive the edges of the glass panes which slide therein as they are raised and lowered. It has been the usual practice to face such rubber channel elements with an appropriate fabric to reduce friction while at the same time forming an adequate seal. It has proven very difficult to apply flock to such channel strips as a substitute for such fabric although flock forms an adherent surface for the purpose desired.

It is accordingly an important object of our invention to provide novel flocking mechanism suitable for the application of flock to various articles and especially to elongated strips of channel cross-section.

Another object is to provide a mechanical method of flocking whereby continuously traveling work may be properly engaged and vibrated during application of the flock to ensure uniform and proper attachment of the latter.

Still another object is to provide flocking mechanism and a method of flocking adapted automatically to apply flock to continuously traveling work and more especially to work having a general elongated channel shape.

A further object is to provide work conveying means operative to grip the work to hold the latter firmly during passage through the mechanical vibrating station to ensure proper vibration of such work during application of the flock.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 3 is a fragmentary perspective view showing the vibratory table of such machine;

Fig. 4 is a top plan view of the endless conveyor belt utilized to transport the work through the machine and showing the means employed for introduction of the work into gripped position on such belt as well as the means for subsequently removing the flocked work from a belt;

Fig. 5 is an enlarged transverse section through the endless belt and belt guide means taken on the line 5—5 on Fig. 1;

Fig. 6 is a similar transverse section taken on the line 6—6 on Fig. 1; and

Fig. 7 is a similar transverse section taken on the line 7—7 on Fig. 1.

Figure 1:
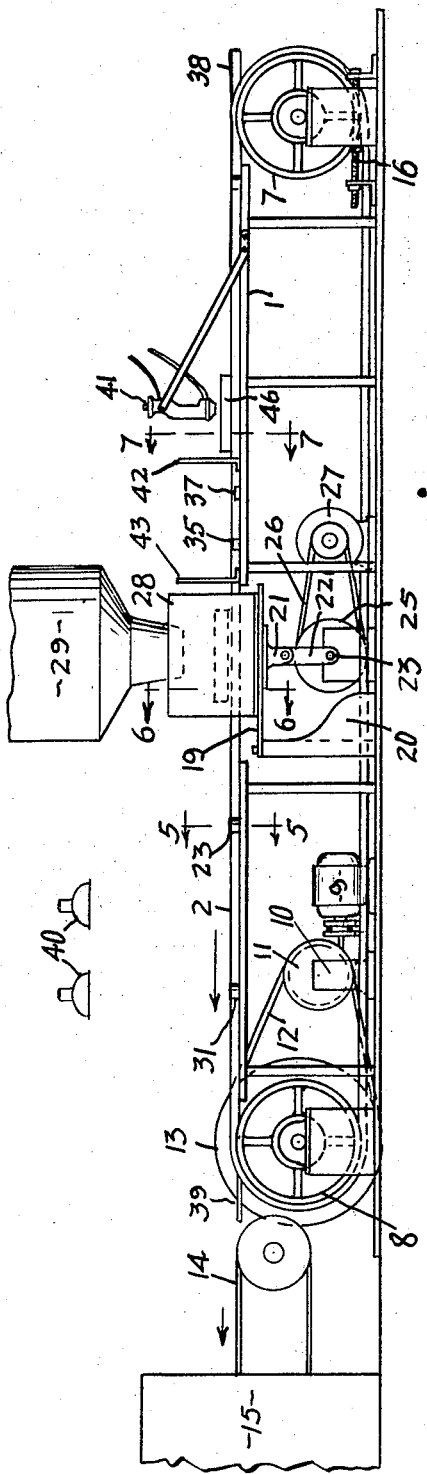
Fig. 1 is a side elevation of a flocking machine embodying the principles of our invention.
Figure 2:
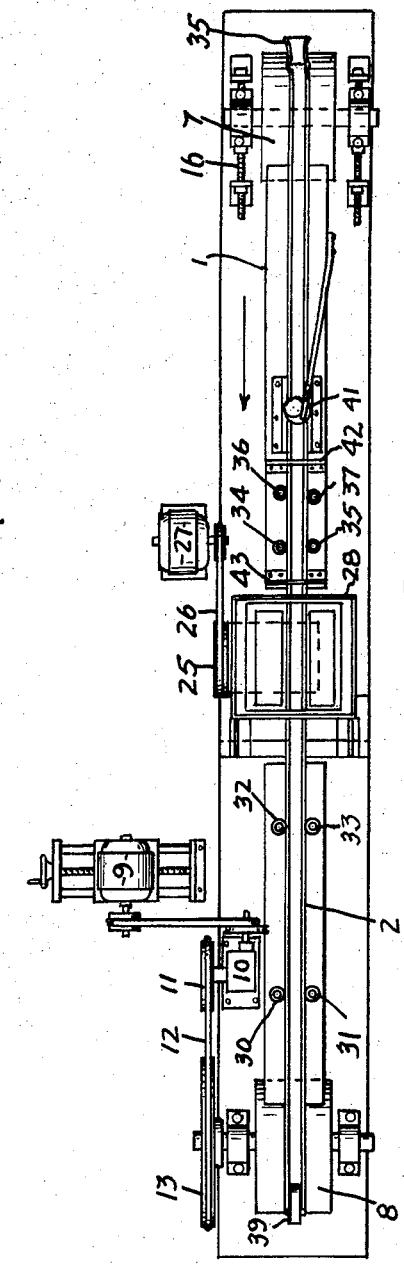
Fig. 2 is a top plan view of such machine.

Referring now more particularly to said drawing and especially Figs. 1–3 thereof, the embodiment of our invention there illustrated comprises a frame having a flat horizontal deck 1 adapted to support the work conveying means. Such work conveying means comprises an endless flexible belt 2, ordinarily of rubber, of the general configuration best shown in cross-section in Figs. 5–7 of the drawing. As is there made clear, such belt is of general shallow U-shape cross-section with small opposed continuous inturned lip portions 3 and 4. An endless flat metal strip 5 may desirably be embedded in the transverse portion of the flexible rubber belt 2 and a strip of anti-friction fabric 6 may be bonded to the underside of the belt to facilitate travel of the latter along the surface of deck 1.

Such endless belt 2 passes around large diameter end pulleys 7 and 8, the upper course of such belt traveling from right to left as viewed in Figs. 1 and 2. The belt may be driven by means of electric motor 9, worm gear speed reducer 10, pulley 11, belt 12 and pulley 13. A take-off conveyor 14 may be provided at the unloading end of conveyor 2 for transporting the flocked work into a curing oven 15. Take-up means 16 associated with pulley 7 serves to take up any slack which may develop in belt 2.

Elongated deck 1 is interrupted generally centrally of the machine for interposition of a flocking table 17 (Fig. 3) across which belt 2 is adapted to pass from right to left. Such table is mounted on two parallel leaf springs 18 and 19 secured at one end to stand 20. The table is additionally supported by pivotally connected links 21 and 22, the lower end of the latter rotatably fitting the eccentric end 23 of a shaft journalled in bearing blocks 24 and carrying drive pulley 25 on its other end, such latter pulley being driven through belt 26 by electric motor 27.

A box enclosure 28 surrounds table 17 with provision being made for the passage of belt 2 therethrough and an upper hopper 29 is provided for delivering flock at the proper rate to the flocking chamber within housing 28. The precise form of flock supply is not an element of the present invention, and such flock may be introduced to housing 28 by any well-known means including belt and screw conveyors.

Rollers 30, 31, 32, 33, 34, 35, 36 and 37 mounted on vertical axes on upper deck 1 serve to position and guide belt 2 in its travel. A belt spreader 38 is mounted adjacent pulley 7 to facilitate introduction of the work into the groove of conveyor belt 2 and a release shoe 39 is similarly provided adjacent pulley 8 to disengage the work from conveyor 2, as more particularly explained below. Infra-red lamps 40 may be provided in addition to oven 15, or in some cases in substitution therefor, to cure or pre-cure the flocked article after the latter emerges from the flocking chamber within housing 28.

A spray gun 41 is mounted in advance of housing 28 above belt 2 in position to spray rubber cement or other appropriate adhesive onto the surface of the work to be flocked. Baffles 42 and 43 through which belt 2 passes intermediate spray gun 41 and housing 28 assist in preventing too wide dispersion of the adhesive and flock toward each other.

The remaining details of our new mechanism will best be described in conjunction with an explanation of the operation of the machine, and particular reference may now be had to Figs. 4–7 inclusive of the drawing. The work, which may for example be long narrow rubber strips of general channel cross-section, adapted to serve as window glass guides and seals, may be fed to conveyor 2 where the lips 3 and 4 of the latter are temporarily spread apart by means of spreader shoe 38, such lips thereupon laterally gripping the work to hold the latter firmly during the remainder of its passage through the machine. Work-pieces of this nature may frequently range from about 2 feet to about 20 feet in length. At the adhesive spraying station beneath gun 41, the conveyor belt 2 passes through a sheet metal fixture including lower lateral guard lips 44 and 45 directly overlying the upper side edge portions of conveyor belt 2, with adjacent upstanding side members 46 and 47 having inturned downwardly sloping flange portions 48 and 49 projecting toward each other as shown in Fig. 7. These portions 44 and 45 and flanges 48 and 49 protect the conveyor belt itself from the adhesive spray while permitting such spray to impinge upon the work carried thereby.

The belt with the adhesive coated work now travels through baffles 42 and 43 and enters the flocking chamber within enclosure housing 28 (Fig. 6) where another sheet metal fixture having inturned flanges 50 and 51 closely overlying the side portions of belt 2 serve to hold the latter snugly against vibrating table 17. Belt 2 and the work gripped thereby are accordingly rapidly vibrated during application of the flock. Laterally outwardly projecting sheet metal wings 52 and 53 receive excess flock which does not descend directly on the adhesive coated work and tosses such flock upwardly and inwardly to fall upon the work.

The belt now leaves the flocking chamber with the flocked article and transports the same beneath the optional infra-red lamps 40 to pre-cure or set the adhesive. A somewhat chisel-shape release shoe 39 fitting within the channel of conveyor belt 2 serves to pry the work out of such channel with laterally projecting lugs 54 and 55 bearing down on the lips of the conveyor belt 2. The flocked articles may now be received and collected by an operator or may continue automatically onto the further take-off conveyor 14 for transport into an appropriate curing oven.

Fig. 7 shows the manner in which the work W, in this case a length of rubber window channel, may be held at the adhesive applying station by the conveyor belt. The excess cement which gradually accumulates on flanges 48 and 49 will be cleaned off as required. Shoes 38 and 39 at the loading and unloading ends of the conveyor will, of course, be supported by appropriate stands or outriggers, not shown. Various well-known types of adhesive including rubber cement and resinous cements may be employed depending on the material, and metal or other powders may be adhered as well as rayon, nylon, and other known flock materials.

It will be seen from the foregoing that we have provided a novel method for mechanically flocking difficult articles such as elongated rubber channels and the like without the necessity of utilizing an electrostatic field although such electrostatic field may also be employed in well-known manner if desired. We have found that our method of mechanical flocking, however, achieves generally superior orientation of the applied flock or granular or powdered material, with such material embedding itself in the adhesive coating in endwise fashion and even distribution.

The flat metal strip insert 5 resists spreading of the base of belt 2 but resiliently distensible lips 3 and 4 are adapted to be deformed to permit loading and unloading of the work W. While belt 2 may ordinarily be of rubber, other plastic materials such as the vinyl plastics may be utilized.

Ather modes of applying the principle of the invention may be employed, change being made as regards the details described, provided the features stated in any of the following claims or the equivalent of such be employed.

We therefore particularly point out and distinctly claim as our invention:

1. In flocking mechanism for an elongated work piece comprising a movably mounted flocking table, power means for mechanically vibrating said table, conveyor-supporting decks on opposite sides of said table, an endless belt conveyor traveling along the upper surface of said decks and table, said conveyor belt having a resiliently distensible groove in its upper surface where thus passing across said deck and table, said groove having a cross-section substantially conforming to that of the portion of the work entering therein tightly to receive and hold such work, groove spreading means at a work loading station, and adhesive spray gun at a subsequent spray station operative to spray adhesive upon the exposed surface of work carried therepast by said belt, guard means laterally overlying the side portions of said belt at said spray station to prevent deposition of adhesive thereon, means on said table overlying and contacting the side edge portions of said belt to hold the latter snugly against said table for vibration therewith, an enclosure enclosing the region above said table through which said belt passes, means operative to deliver flock to such region to adhere to the vibrating adhesive coated work transported by said belt, and means operative to pry the flocked work from such groove in said belt at a later station.

2. The apparatus of claim 1 including heat lamps operative to set such adhesive subsequent to the flock applying station.

3. The apparatus of claim 1 including a take-off conveyor positioned to receive the flocked work after disengagement of the latter from said grooved belt by said pry means.

4. A conveyor belt for firmly gripping and conveying elongated articles comprising a resiliently deformable endless rubber belt of general U-shape channel cross-section, such channel opening outwardly and conforming generally to the cross-section of at least a portion of the elongated article snugly to grip such portion, anti-friction material applied to the other side of said belt from such channel, and a flat metal band embedded in the transversely extending portion of said belt.

5. The belt of claim 4, having longitudinally extending resiliently distensible inturned lips on each side of such groove.

6. In flocking mechanism for flocking elongated articles, comprising a table, means for vibrating said table, and flock supply means operative to deliver flock above said table for deposit on such article supported thereon; article conveying means disposed for longitudinal movement across said table, said conveying means having a substantially longitudinally-extening groove to receive therein such elongated article, said groove having a cross-sectional configuration substantially conforming to that of at least the portion of the elongated article entering therein effective to hold the article firmly during passage across the vibrating table, and holding means overlying and contacting marginal portions of said conveying means effective to hold the latter closely against said table for vibration therewith.

7. The mechanism of claim 6 including an adhesive spray station operative to spray adhesive on such work transported by said conveyor prior to arrival at said table.

8. The mechanism of claim 6 wherein said longitudinally extending groove for receiving such elongated article is resiliently deformable.

9. The mechanism of claim 6 wherein said longitudinally extending groove for receiving the elongated article is resiliently deformable and further including means operative to spread such groove at the loading end of said conveyor, and means operative to disengage flocked articles from such groove at the unloading end of said conveyor.

10. In flocking mechanism for flocking elongated articles; a continuous work-transporting conveyor belt having a longitudinally-extending, resiliently laterally distensible, groove therein, said groove having a cross-section substantially matching that of such elongated article snugly to engage said article and transport it through a flock applying station, and means operative mechanically to vibrate said belt at said station.

11. In flocking mechanism for flocking elongated articles; a continuous work-transporting conveyor belt having a longitudinally-extending, resiliently laterally distensible, groove therein, said groove having a cross-section substantially matching that of such elongated article snugly to engage said article and transport it through a flock applying station, and means operative temporarily to spread such groove at a work loading station.

12. In flocking mechanism for flocking elongated articles; a continuous work-transporting conveyor belt having a longitudinally-extending, resiliently laterally distensible, groove therein, said groove having a cross-section substantially matching that of such elongated article snugly to engage said article and transport it through a flock applying station, and means fitting in such groove at a work unloading station operative to pry such work from such groove.

13. In flocking mechanism for flocking elongated articles; a continuous work-transporting conveyor belt having a longitudinally-extending, resiliently laterally distensible, groove therein, said groove having a cross-section substantially matching that of such elongated article snugly to engage said article and transport it through a flock applying station, guide means closely engaging said belt, and means operative to vibrate said guide means to vibrate said belt.

14. A method of uniformly flocking an elongated article comprising firmly and integrally securing the article to a conveyor surface, moving the conveyor surface and article secured thereto unidirectionally in a general path of travel, applying an adhesive on such article, discharging flock over and onto such article during such movement, and simultaneously vibrating the conveyor surface to swing the conveyor surface and article in unison in and out of such general path of travel while maintaining said conveyor surface and article in fixed interrelation to embed the flock endwise into such adhesive and thereby provide a superior orientation and even distribution of the flock.

References Cited in the file of this patent

UNITED STATES PATENTS

| | | |
|---|---|---|
| 594,220 | Trent | Nov. 23, 1897 |
| 1,009,264 | Spadone | Nov. 21, 1911 |
| 2,020,319 | King | Nov. 12, 1935 |
| 2,363,846 | Duggan | Nov. 28, 1944 |
| 2,631,561 | Calton | Mar. 17, 1953 |
| 2,633,230 | Duncan | Mar. 31, 1953 |
| 2,655,895 | Abeles | Oct. 20, 1953 |